W. M. & W. H. PENNISTON.
COTTON AND HAY PRESS.

No. 182,954.      Patented Oct. 3, 1876.

WITNESSES:  
E. Wolff.  
John Goethals

INVENTOR:  
W. M. Penniston  
W. H. Penniston  
BY  
ATTORNEYS.

UNITED STATES PATENT OFFICE.

WILLIAM M. PENNISTON AND WILLIAM H. PENNISTON, OF FOX, MISSOURI.

IMPROVEMENT IN COTTON AND HAY PRESSES.

Specification forming part of Letters Patent No. 182,954, dated October 3, 1876; application filed June 20, 1876.

*To all whom it may concern:*

Be it known that we, WILLIAM M. PENNISTON and WILLIAM H. PENNISTON, of Fox, Ray county, Missouri, have invented a new and Improved Cotton and Hay Press, of which the following is a specification:

Our invention consists of a lever-presser, in combination with one side of the pressing-case, to press the hoops against the side of the bale to hold them in position while they are secured on the other side; a lever-presser on said other side to hold the hoops at one end while they are strained by the other end and fastened; and a lever contrivance for straining and holding the hoops for fastening them.

Figure 1:
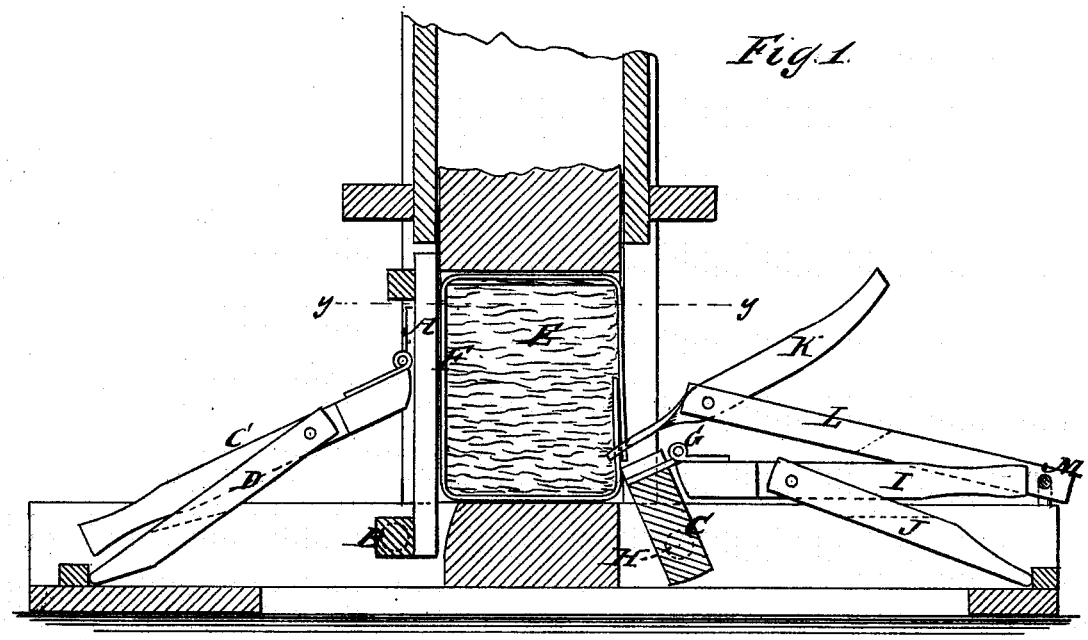
Figure 2:
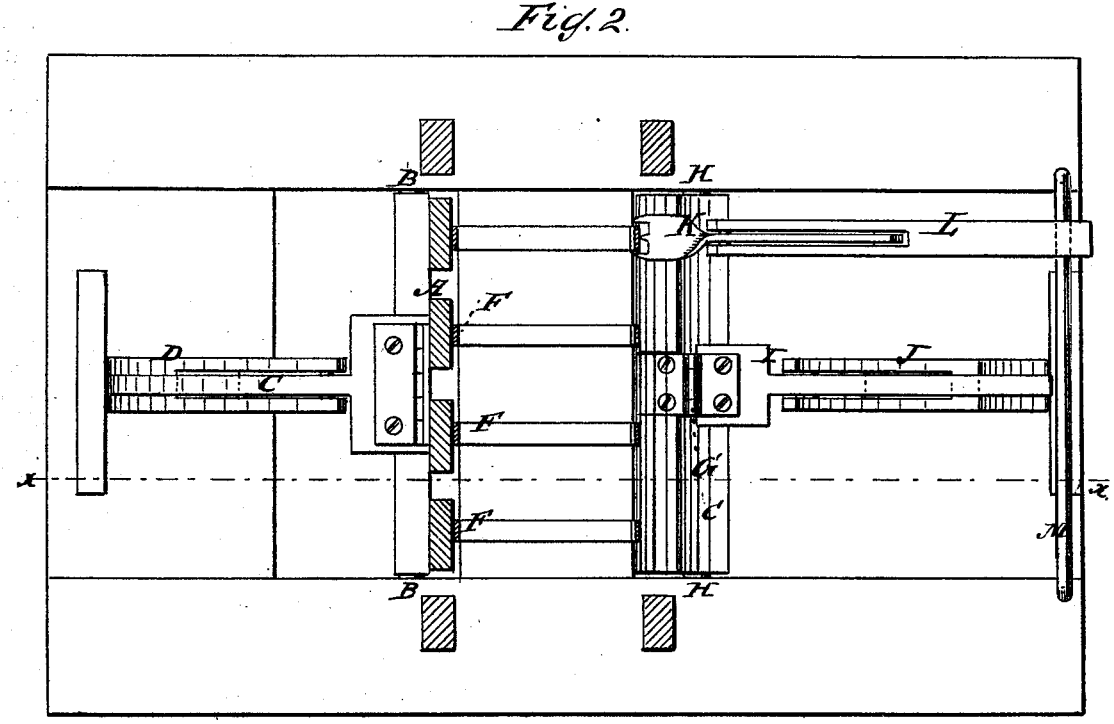

Figure 1 is a sectional elevation of a press constructed according to our invention, the section being taken on line $x\ x$, Fig. 2.

Similar letters of reference indicate corresponding parts.

The side A of the case, which is pivoted to the frame at B, has a lever, C, pivoted to it, which has a brace, D, connected so that when the bale B has been pressed in the side can be slacked away to apply the hoops, and then can be pressed up against the hoops again to press them snugly against the bale to prevent them from sagging outward, and on the other side of the case is a presser, G, pivoted to the frame at H, and having lever I and brace J for similarly pressing up and holding the lower ends of the hoops while the latter are stretched, and the upper ends pulled down and held upon or over the lower ends to be nailed by the forked lever K, which is pivoted to the fulcrum L, which is pivoted to the frame at M, so as to have a strong purchase and considerable range of movement. This forked lever is contrived to take hold of the hoop by its points, which are to be adapted to hook into the wood sufficiently for that purpose.

By these contrivances the hoops, which are designed to be of wood, can be quickly applied, and can be fastened very tightly.

Having thus decribed our invention, we claim as new and desire to secure by Letters Patent—

The case having pivoted side A, the lever C, having pivoted brace D, the pivoted presser G, and the lever I, having pivoted brace J, in combination with a lever, K, having circular prongs provided with a teat or projection, as shown and described, for the purpose specified.

WILLIAM M. PENNISTON.
WILLIAM H. PENNISTON.

Witnesses:
JACOB WALTER,
CYRUS VINYARD.